(12) United States Patent
Huth et al.

(10) Patent No.: US 11,780,183 B2
(45) Date of Patent: Oct. 10, 2023

(54) METHOD FOR MANUFACTURING A STRUCTURAL COMPONENT OF A BLADE SEGMENT FOR A ROTOR BLADE OF A WIND TURBINE

(71) Applicant: General Electric Company, Schenectady, NY (US)

(72) Inventors: Scott Jacob Huth, Greenville, SC (US); Xu Chen, Simpsonville, SC (US); Louis Rondeau, Greenville, SC (US); Andrew Mitchell Rodwell, Greenville, SC (US); Scott Iverson Shillig, Greenville, SC (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 17/312,778

(22) PCT Filed: Dec. 11, 2018

(86) PCT No.: PCT/US2018/064836
§ 371 (c)(1),
(2) Date: Jun. 10, 2021

(87) PCT Pub. No.: WO2020/122865
PCT Pub. Date: Jun. 18, 2020

(65) Prior Publication Data
US 2022/0063216 A1 Mar. 3, 2022

(51) Int. Cl.
*B29C 70/48* (2006.01)
*B29C 70/44* (2006.01)
(Continued)

(52) U.S. Cl.
CPC ............ *B29C 70/48* (2013.01); *B29C 70/446* (2013.01); *B29C 70/84* (2013.01); *F03D 1/0675* (2013.01);
(Continued)

(58) Field of Classification Search
CPC .............................. B29C 70/48; B29C 70/446
See application file for complete search history.

(56) References Cited

U.S. PATENT DOCUMENTS

| 851,196 A | 4/1907 | Bevans et al. |
| 4,474,536 A | 10/1984 | Gougeon et al. |

(Continued)

FOREIGN PATENT DOCUMENTS

| CN | 105690790 A | 6/2016 |
| EP | 2186622 A1 | 5/2010 |

(Continued)

OTHER PUBLICATIONS

Machine translation of FR 3041561 A1 dated Mar. 2017. (Year: 2017).*

(Continued)

*Primary Examiner* — Robert B Davis
(74) *Attorney, Agent, or Firm* — Dority & Manning, P.A.

(57) ABSTRACT

A method for manufacturing a structural component of a blade segment for a segmented rotor blade of a wind turbine includes providing a mold of the structural component. The mold has an outer wall that defines an outer surface of the structural component. The method also includes securing at least one tooling pin to the outer wall for defining a pin joint slot in the structural component. Further, the method includes laying up one or more outer fiber layers in the mold so as to at least partially cover the outer wall. The outer fiber layer(s) has at least one hole that receives the tooling pin(s). As such, the outer fiber layer(s) form the outer surface of the (Continued)

structural component. Moreover, the method includes placing one or more structural features atop the outer fiber layer(s) in the mold. In addition, the method includes infusing the outer fiber layer(s) and the structural feature(s) together via a resin material so as to form the structural component.

18 Claims, 12 Drawing Sheets

(51) Int. Cl.
*B29C 70/84* (2006.01)
*F03D 1/06* (2006.01)
*B29L 31/08* (2006.01)

(52) U.S. Cl.
CPC ..... *B29L 2031/085* (2013.01); *F05B 2230/50* (2013.01); *F05B 2240/302* (2013.01); *F05B 2280/6013* (2013.01); *F05B 2280/6015* (2013.01)

(56) References Cited

U.S. PATENT DOCUMENTS

| | | | |
|---|---|---|---|
| 4,643,646 A | 2/1987 | Hahn et al. | |
| 4,732,542 A | 3/1988 | Hahn et al. | |
| 5,281,454 A | 1/1994 | Hanson | |
| 7,334,989 B2 | 2/2008 | Arelt | |
| 7,344,360 B2 | 3/2008 | Wetzel | |
| 7,901,188 B2 | 3/2011 | Llorente Gonzalez et al. | |
| 7,922,454 B1 | 4/2011 | Riddell | |
| 7,927,077 B2 | 4/2011 | Olson | |
| 7,997,874 B2 | 8/2011 | van der Bos | |
| 7,998,303 B2 | 8/2011 | Baehmann et al. | |
| 8,123,488 B2 | 2/2012 | Finnigan et al. | |
| 8,297,932 B2 | 10/2012 | Arocena De La Rua et al. | |
| 8,348,622 B2 | 1/2013 | Bech | |
| 8,356,982 B2 | 1/2013 | Petri Larrea et al. | |
| 8,376,713 B2 | 2/2013 | Kawasetsu et al. | |
| 8,388,316 B2 | 3/2013 | Arocena De La Rua et al. | |
| 8,517,689 B2 | 8/2013 | Kyriakides et al. | |
| 8,919,754 B2 | 12/2014 | Schibsbye | |
| 9,669,589 B2 | 6/2017 | Zamora Rodriguez et al. | |
| 10,107,257 B2* | 10/2018 | Yarbrough | B29C 70/0035 |
| 10,830,214 B2 | 10/2020 | Akhtar et al. | |
| 2007/0018049 A1 | 1/2007 | Stuhr | |
| 2007/0253824 A1 | 11/2007 | Eyb | |
| 2009/0116962 A1 | 5/2009 | Pedersen et al. | |
| 2009/0155084 A1 | 6/2009 | Livingston et al. | |
| 2009/0162208 A1 | 6/2009 | Zirin et al. | |
| 2010/0132884 A1 | 6/2010 | Baehmann et al. | |
| 2010/0215494 A1 | 8/2010 | Bech et al. | |
| 2010/0304170 A1 | 12/2010 | Frederiksen | |
| 2011/0052403 A1 | 3/2011 | Kawasetsu et al. | |
| 2011/0081247 A1 | 4/2011 | Hibbard | |
| 2011/0081248 A1 | 4/2011 | Hibbard | |
| 2011/0091326 A1 | 4/2011 | Hancock | |
| 2011/0158788 A1 | 6/2011 | Bech et al. | |
| 2011/0158806 A1 | 6/2011 | Arms et al. | |
| 2011/0229336 A1 | 9/2011 | Richter et al. | |
| 2012/0093627 A1 | 4/2012 | Christenson et al. | |
| 2012/0196079 A1 | 8/2012 | Brauers et al. | |
| 2012/0213642 A1 | 8/2012 | Wang et al. | |
| 2012/0269643 A1 | 10/2012 | Hibbard et al. | |
| 2012/0308396 A1 | 12/2012 | Hibbard | |
| 2013/0040151 A1 | 2/2013 | Jeromerajan et al. | |
| 2013/0064663 A1 | 3/2013 | Loth et al. | |
| 2013/0129518 A1 | 5/2013 | Hayden et al. | |
| 2013/0164133 A1 | 7/2013 | Grove-Nielsen | |
| 2013/0177433 A1 | 7/2013 | Fritz et al. | |
| 2013/0189112 A1 | 7/2013 | Hedges et al. | |
| 2013/0189114 A1 | 7/2013 | Jenzewski et al. | |
| 2013/0219718 A1 | 8/2013 | Busbey et al. | |
| 2013/0224032 A1 | 8/2013 | Busbey et al. | |
| 2013/0236307 A1 | 9/2013 | Stege | |
| 2013/0236321 A1 | 9/2013 | Olthoff | |
| 2014/0286780 A1 | 9/2014 | Lemos et al. | |
| 2015/0204200 A1 | 7/2015 | Eyb et al. | |
| 2015/0369211 A1 | 12/2015 | Merzhaeuser | |
| 2018/0171968 A1* | 6/2018 | Hunter | F03D 1/0675 |
| 2018/0252202 A1* | 9/2018 | Johnson | B29C 70/342 |
| 2018/0340510 A1 | 11/2018 | Huth et al. | |
| 2020/0094442 A1* | 3/2020 | D'Alesio | B29C 70/547 |

FOREIGN PATENT DOCUMENTS

| | | | |
|---|---|---|---|
| EP | 3069858 A1 | 9/2016 | |
| EP | 3144526 A1 | 3/2017 | |
| FR | 1012578 A | 7/1952 | |
| FR | 2710871 A1 | 4/1995 | |
| FR | 2772662 A1 | 6/1999 | |
| FR | 3041561 A1 * | 3/2017 | |
| GB | 2477847 A | 8/2011 | |
| WO | WO2009/034291 A2 | 3/2009 | |
| WO | WO2009/077192 A2 | 6/2009 | |
| WO | WO2010/023299 A2 | 3/2010 | |
| WO | WO2011/064553 A2 | 6/2011 | |
| WO | WO2011/066279 A2 | 6/2011 | |
| WO | WO2015/051803 A1 | 4/2015 | |
| WO | WO2015/185066 A1 | 12/2015 | |

OTHER PUBLICATIONS

PCT International Search Report Corresponding to PCT/US2018/064836 dated Sep. 16, 2019.
The English translation of the CN Search Report for CN application No. 201880100193.4, dated Jul. 28, 2022, 3 pages.
The foreign office action and English translation for CN application No. 201880100193.4, dated Apr. 1, 2023, 23 pages.
Campbell Jr., F., Manufacturing Processes for Advanced Composites, Jiao Tong University Press, Shanghai, Dec. 31, 2016, 5 pages (translation not available).

* cited by examiner

METHOD FOR MANUFACTURING A STRUCTURAL COMPONENT OF A BLADE SEGMENT FOR A ROTOR BLADE OF A WIND TURBINE

FIELD

The present disclosure relates generally to wind turbines, and more particularly to a method for manufacturing a structural component, such as a beam structure or a receiving section, of a blade segment for a segmented rotor blade of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

In addition, as wind turbines continue to increase in size, the rotor blades also continue to increase in size. As such, modern rotor blades may be constructed in segments that are joined together at one or more joints. Accordingly, certain jointed rotor blades include a first blade segment having a beam structure that is received within a receiving section of a second blade segment that is further secured together via one or more span-wise and chord-wise extending pins that transfer the blade bending moment from one segment to the other. Moreover, the reactions from the pins are transferred to various bearing blocks at the joint locations via one or more bushings.

Machining the large structural components of the blade segments can be complex. For example, in certain instances, a complex fixturing process may need to be performed to secure the beam structure or receiving section in place to consistently locate the pin holes in the part. Further, an expensive, custom drilling machine is typically required to ensure that the part can be drilled in one setup without having to move the part during the drilling process. Moreover, if there is a quality issue in the drilling process, the entire structural component may be defective and unusable.

Accordingly, the present disclosure is directed to methods for manufacturing a structural component of a blade segment for a segmented rotor blade of a wind turbine that addresses the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for manufacturing a structural component of a blade segment for a segmented rotor blade of a wind turbine. The method includes providing a mold of the structural component. The mold has an outer wall that defines an outer surface of the structural component. The method also includes securing at least one tooling pin to the outer wall for defining a pin joint slot in the structural component. Further, the method includes laying up one or more outer fiber layers in the mold so as to at least partially cover the outer wall. The outer fiber layer(s) has at least one hole that receives the tooling pin(s). As such, the outer fiber layer(s) form the outer surface of the structural component. Moreover, the method includes placing one or more structural features atop the outer fiber layer(s) in the mold. In addition, the method includes infusing the outer fiber layer(s) and the structural features (s) together via a resin material so as to form the structural component.

In one embodiment, the structural component may include a beam structure and/or a receiving section of the blade segment. In another embodiment, placing the structural features(s) atop the outer fiber layer(s) in the mold may include placing a first layer of one or more pultrusions atop the outer fiber layer(s). In another embodiment, placing the structural feature(s) atop the outer fiber layer(s) in the mold may include placing one or more shear webs atop the outer fiber layer(s) and the first layer of the pultrusion(s). In such embodiments, the shear web(s) includes a web hole that receives the tooling pin(s).

In further embodiments, the method may include placing one or more bushings to the outer wall within the mold and securing the tooling pin(s) within the bushing(s).

In additional embodiments, securing the tooling pin(s) to the outer wall for defining the pin joint slot in the structural component may include securing a single tooling pin from a leading edge end of the mold to a trailing edge end of the mold. In alternative embodiments, securing the tooling pin(s) to the outer wall for defining the pin joint slot in the structural component may include securing a leading edge tooling pin at a leading edge end of the mold and securing a separate trailing edge tooling pin at a trailing edge end of the mold. In such embodiments, the leading and trailing edge tooling pins are coaxially aligned in a chord-wise direction of the structural component.

In certain embodiments, placing the shear web(s) atop the outer fiber layer(s) and the first layer of the pultrusion(s) may include placing at least one leading edge shear web at the leading edge end of the mold such that a leading edge hole of the leading edge shear web(s) receives the leading edge tooling pin and placing a trailing edge shear web at the trailing edge end of the mold such that a trailing edge hole of the trailing edge shear web(s) receives the trailing edge tooling pin.

In further embodiments, the method may include placing one or more inner fiber layers so as to cover the shear web(s) and the first layer of the pultrusion(s). In further embodiments, the method may include placing at least one mandrel atop the one or more inner fiber layers so as to provide a base shape for shaping the structural component thereon. Further, the mandrel may be constructed of a compressible material. In addition, the method may include folding ends of the inner fiber layer(s) around the mandrel(s).

In several embodiments, placing the one or more structural features atop the outer fiber layer(s) in the mold may include placing a second layer of one or more pultrusions atop the folded ends of the one or more inner fiber layers. In yet another embodiment, the method may include folding ends of the outer fiber layer(s) around the second layer of the pultrusion(s).

In particular embodiments, the mold may include a first mold portion and a second mold portion. In such embodiments, the method may include placing the second mold portion atop the first mold portion that contains the outer fiber layer(s) and the structural feature(s) and subsequently infusing the outer fiber layer(s) and the structural feature(s) together so as to form the structural component.

In additional embodiments, the method may further include removing the leading edge tooling pin, the trailing edge tooling pin, and/or the mandrel after infusing the outer fiber layer(s) and the structural feature(s) together to partially form the pin joint slot.

In another aspect, the present disclosure is directed to a molding kit for manufacturing a structural component of a blade segment for a segmented rotor blade of a wind turbine. The molding kit includes a first mold portion having an outer wall that defines an outer surface of the structural component, at least one tooling pin secured to the outer wall for defining a pin joint slot in the structural component, and a second mold portion configured to fit with the first mold portion after one or more materials are placed therein to form the structural component so as to create a vacuum that can draw a resin material within the first and second mold portions for infusing the one or more materials together.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
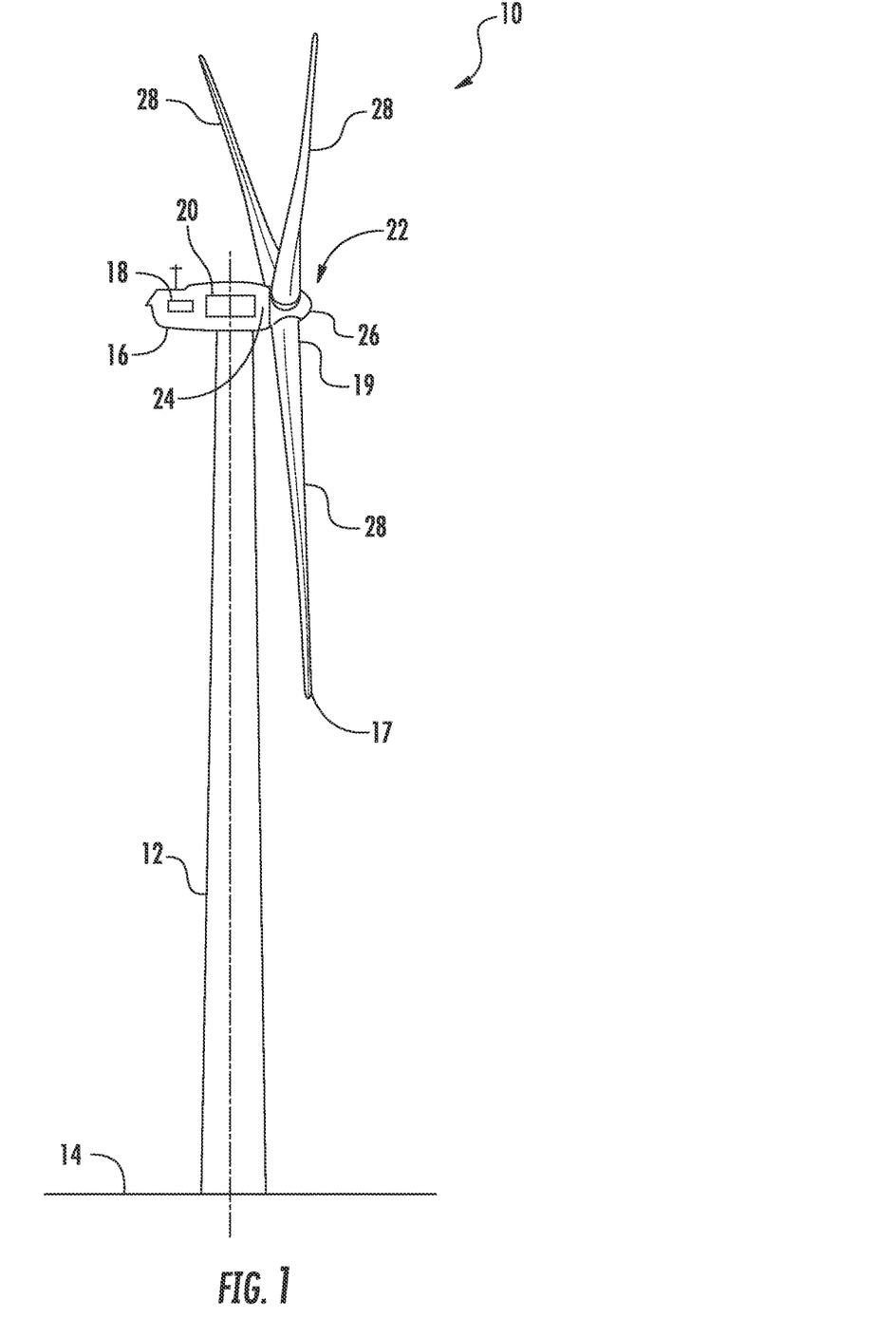
FIG. 1 illustrates a perspective view of one embodiment of a wind turbine according to the present disclosure.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
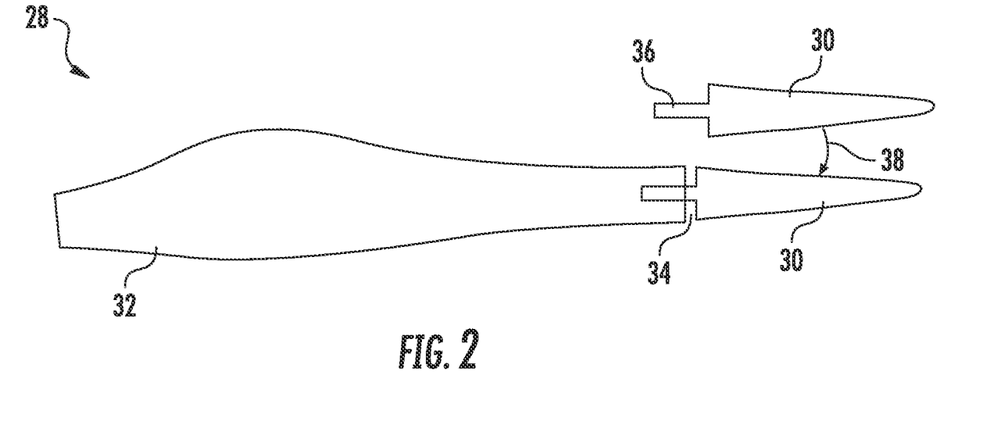
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include at least one shell member, such as pressure side shell member and/or a suction side shell member. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32. In addition, as shown, the second blade segment includes multiple spar structures 66 (also referred to herein as spar caps) that extend lengthwise for connecting with a blade root section 35 of the rotor blade 28 (which is shown in more detail in FIG. 7) and with the beam structure 40 of the first blade segment 30 (which is shown in more detail in FIG. 5).

Figure 3:
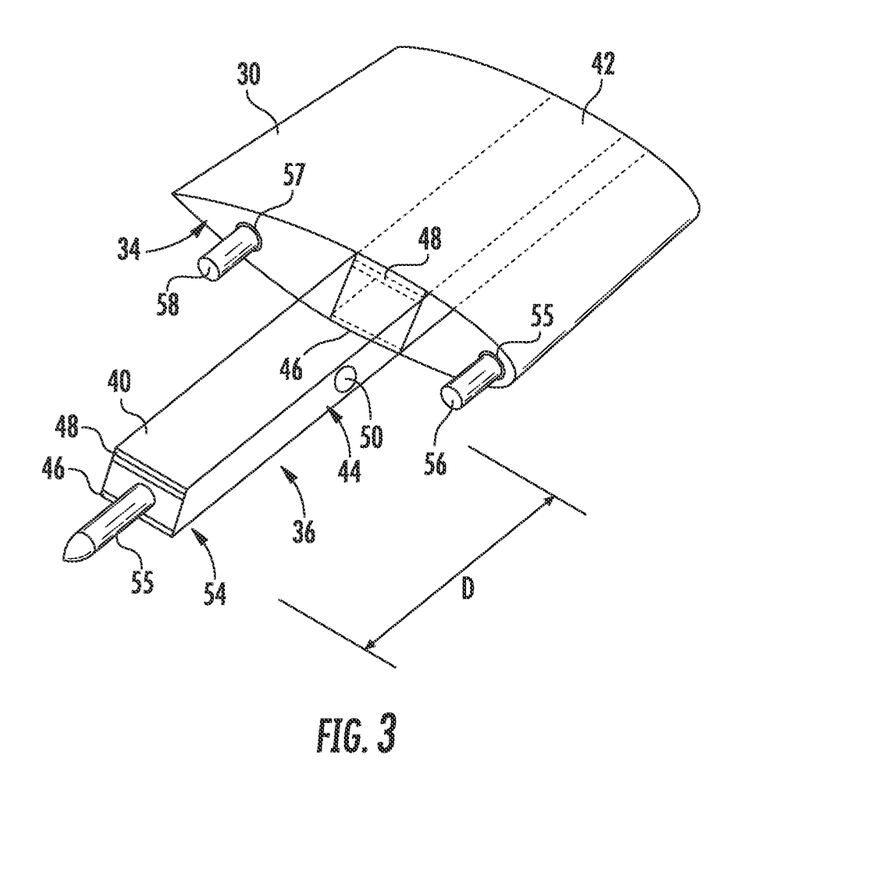
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms a part of the first blade segment 30 having an extension protruding from a spar section 42, thereby forming an extending spar section. The beam structure 40 includes a shear web 44 connected with a suction side spar cap 46 and a pressure side spar cap 48.

Moreover, as shown, the first blade segment 30 may include one or more first pin joints towards a first end 54 of the beam structure 40. In one embodiment, the pin joint may include a pin that is in a tight interference fit with a bushing. More specifically, as shown, the pin joint(s) may include one pin tube 52 located on the beam structure 40. Thus, as shown, the pin tube 52 may be oriented in a span-wise direction. Further, the first blade segment 30 may also include a pin joint slot 50 located on the beam structure 40 proximate to the chord-wise joint 34. Moreover, as shown, the pin joint slot 50 may be oriented in a chord-wise direction. In one example, there may be a bushing within the pin joint slot 50 arranged in a tight interference fit with a pin tube or pin (shown as pin 53 in FIG. 6). Further, the first blade segment 30 may include multiple second pin joint tubes 56, 58 located at the chord-wise joint 34. Thus, as shown, the second pin joint tubes 56, 58 may include a leading edge pin joint tube 56 and a trailing edge pin joint tube 58. Further, each of the second pin joint tubes 56, 58 may be oriented in a span-wise direction. In addition, as shown, each of the second pin joint tubes 56, 58 may include multiple flanges 55, 57, respectively, that are configured to distribute compression loads at the chord-wise joint 34.

It is to be noted that the pin tube 52 located at the first end of the beam structure 40 may be separated span-wise with the multiple second pin joint tubes 56, 58 located at the chord-wise joint 34 by an optimal distance D. This optimal distance D may be such that the chord-wise joint 34 is able to withstand substantial bending moments caused due to shear loads acting on the chord-wise joint 34. In another embodiment, each of the pin joints connecting the first and second blade segments 30, 32 may include an interference-fit steel bushed joint.

Figure 4:
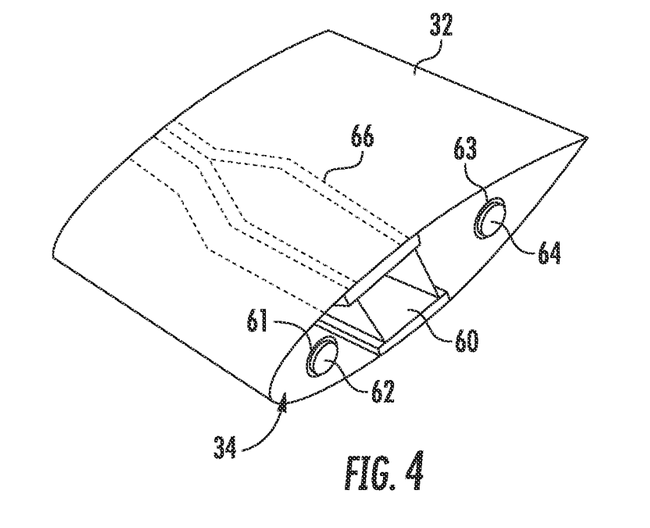
FIG. 4 illustrates a perspective view of one embodiment of a section of the second blade segment at the chord-wise joint according to the present disclosure.

Referring now to FIG. 4, a perspective view of a section of the second blade segment 32 at the chord-wise joint 34 according to the present disclosure is illustrated. As shown, the second blade segment 32 includes a receiving section 60 extending lengthwise within the second blade segment 32 for receiving the beam structure 40 of the first blade segment 30. The receiving section 60 includes the spar structures 66 that extend lengthwise for connecting with the beam structure 40 of the first blade segment 30. As shown, the second blade segment 32 may further include pin joint slots 62, 64 for receiving pin tubes 56, 58 (shown in FIG. 3) of the first blade segment 30 and forming tight interference fittings. In one example, each of the multiple pin joint slots 62, 64 may include multiple flanges 61, 63, respectively, that are configured to distribute compression loads at the chord-wise joint 34.

Figure 5:
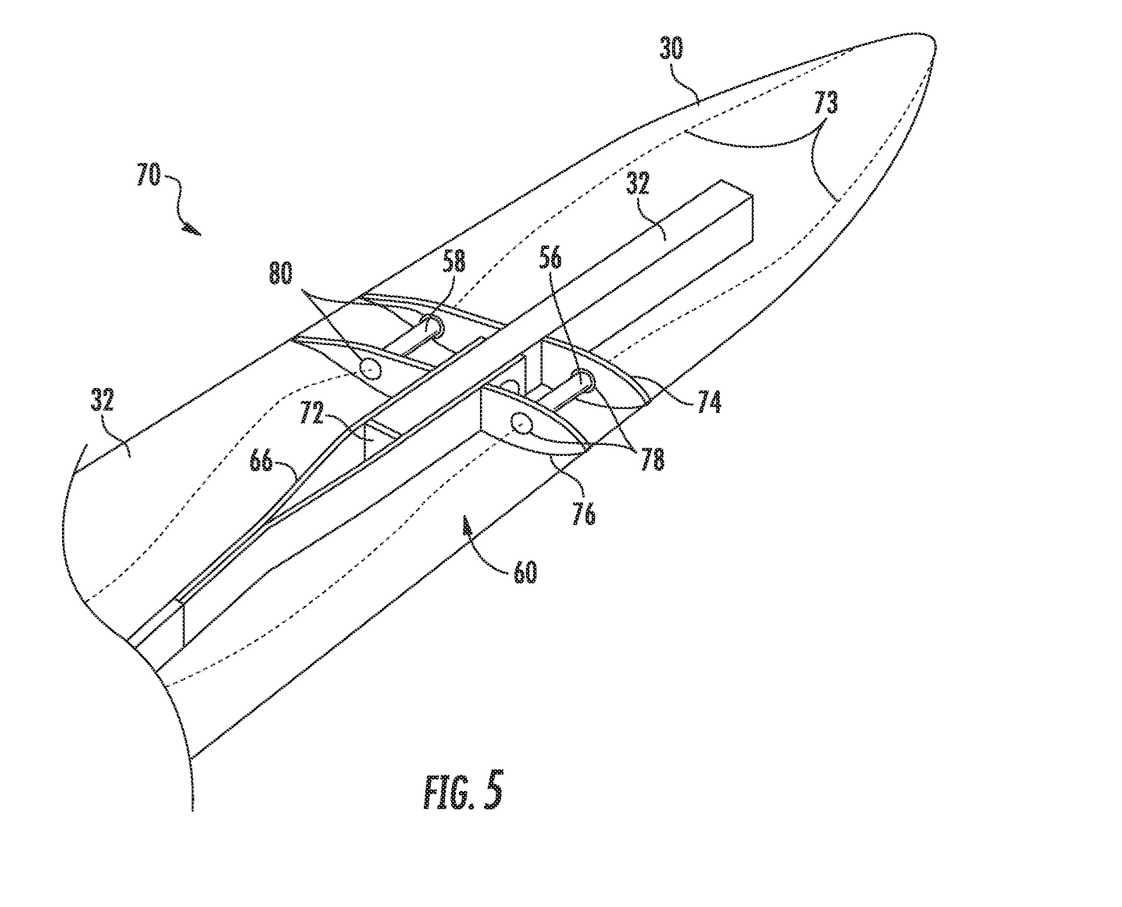
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. Further, as shown, the receiving section 60 includes the multiple spar structures 66 extending lengthwise and supports the beam structure 40. The receiving section 60 also includes a rectangular fastening element 72 that connects with the pin tube 52 of the beam structure 40 in the span-wise direction. Further, the first and the second blade segments 30, 32 may also include chord-wise members 74, 76 respectively at the chord-wise joint 34. Further, as shown, the chord-wise members 74, 76 may include leading edge pin openings 78 and trailing edge pin openings 80 that allows pin joint connections between the first and second blade segments 30, 32. For example, as shown, the chord-wise members 74, 76 are connected by pin tubes 56 and 58 that are in tight interference fit with bushings located in the leading edge pin openings 78 and the trailing edge pin openings 80. In another embodiment, each of the spar structures 66, the rectangular fastening element 72, and the chord-wise members 74, 76 may be constructed of glass reinforced fibers. In this example, the assembly 70 may also include multiple lightening receptor cables 73 that are embedded between the multiple pin tubes or pins 56, 58 and the bushing connections attached to the chord-wise members 74, 76.

Figure 6:
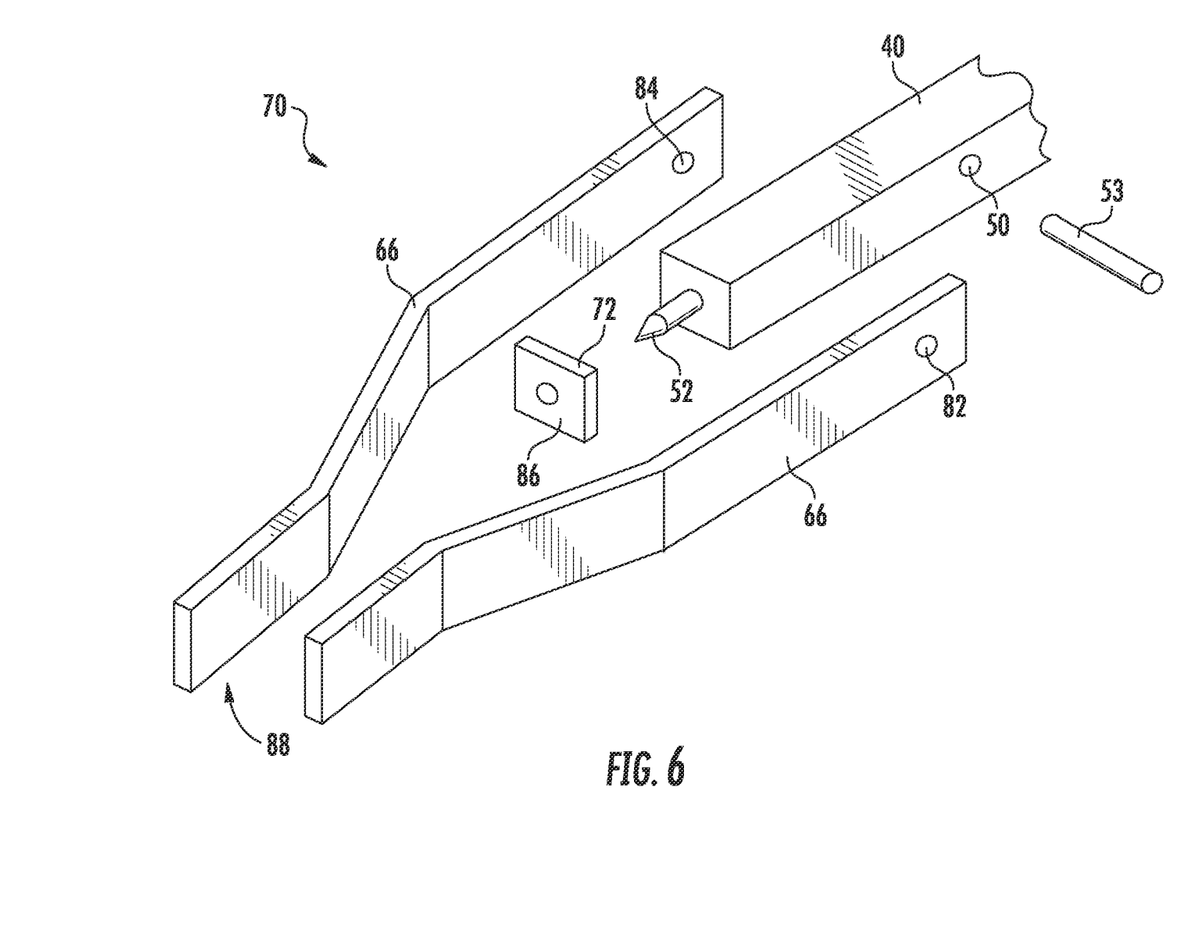
FIG. 6 illustrates an exploded perspective view of one embodiment of the multiple supporting structures of the assembly of the rotor blade of the wind turbine according to the present disclosure.

Referring now to FIG. 6, an exploded perspective view of the multiple supporting structures of the assembly 70 towards the receiving section 60 of the rotor blade 28 is illustrated. As shown, a pair of spar structures 66 is configured to receive the beam structure 40 and includes pin joint slots 82, 84 that are aligned with the pin joint slot 50 of the beam structure 40 through which a pin tube or pin 53 may be inserted. Further, the pin 53 is configured to remain in a tight interference fit within the aligning pin joint slots 82, 50, 84 such that spar structures 66 and the beam structure 40 are joined together during assembling. Further, FIG. 6 also illustrates a fastening element 72 that includes a pin joint slot 86 configured for receiving the pin tube 52 of the beam structure 40. As such, the pin tube 52 is configured to form a tight interference fit pined joint. Further, the pair of spar structures 66 may be joined together at one end 88 using any suitable adhesive material or an elastomeric seal.

Figure 7:
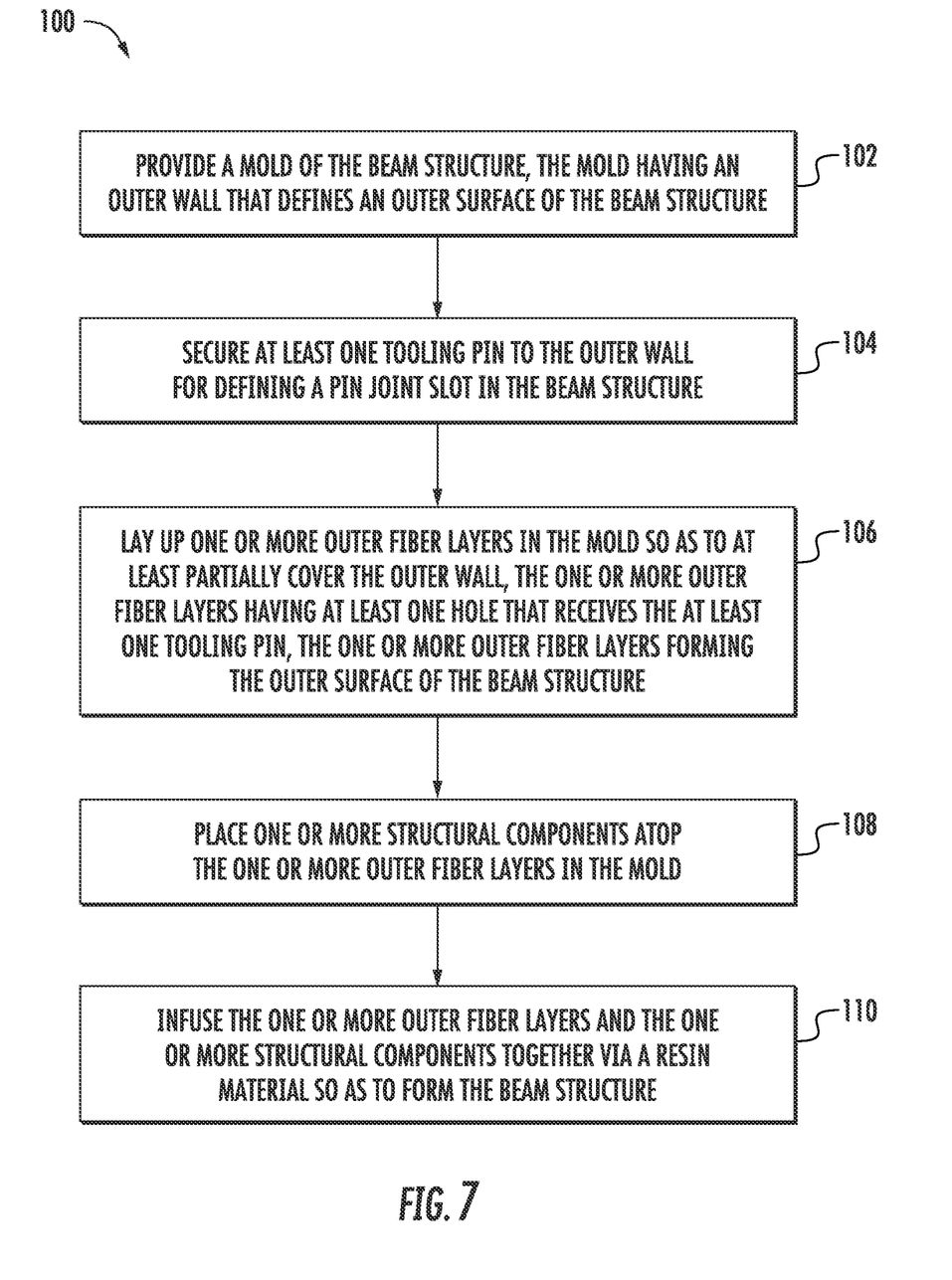
FIG. 7 illustrates a flow chart of one embodiment of a method for manufacturing a beam structure of a blade segment for a segmented rotor blade of a wind turbine according to the present disclosure.

Referring now to FIG. 7, a flow chart 100 of a method for manufacturing a structural component, such as a beam structure or a receiving section, of a blade segment for a segmented rotor blade of a wind turbine according to the present disclosure is illustrated. In general, the method 100 will be described herein with reference to the beam structure 40 of the rotor blade 28 shown in FIGS. 1-6. However, it should be appreciated that the disclosed method 100 may be implemented with rotor blades having any other suitable configurations. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 8:
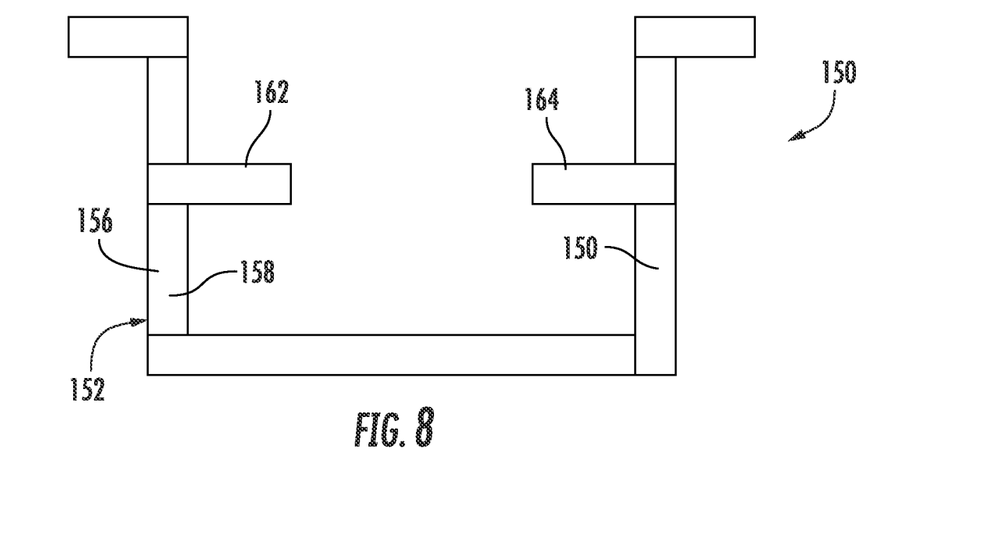
FIG. 8 illustrates a front view of one embodiment of a mold of a beam structure of a blade segment of a rotor blade according to the present disclosure, particularly illustrating a plurality of coaxially-aligned tooling pins arranged in the mold for defining a pin joint slot of the beam structure during the manufacturing process.

As shown at (102), the method 100 may include providing a mold 150 of the beam structure 40. As shown at (104), the method 100 may include securing at least one tooling pin to the outer wall 156 of the mold 150 for defining the pin joint slot 50 in the beam structure 40. For example, as shown in FIG. 8, the outer wall 156 of the mold 150 defines an outer surface of the beam structure 40 and includes a leading edge end 158 and a trailing edge end 160. Further, as shown, a leading edge tooling pin 162 may be secured at the leading edge end 158 of the mold 150 and a separate trailing edge tooling pin 164 may be secured at the trailing edge end 160 of the mold 150. In such embodiments, the leading and trailing edge tooling pins 162, 164 are coaxially aligned in a chord-wise direction of the beam structure 40 so as to properly define the bolt joint slot 50.

Figure 9:
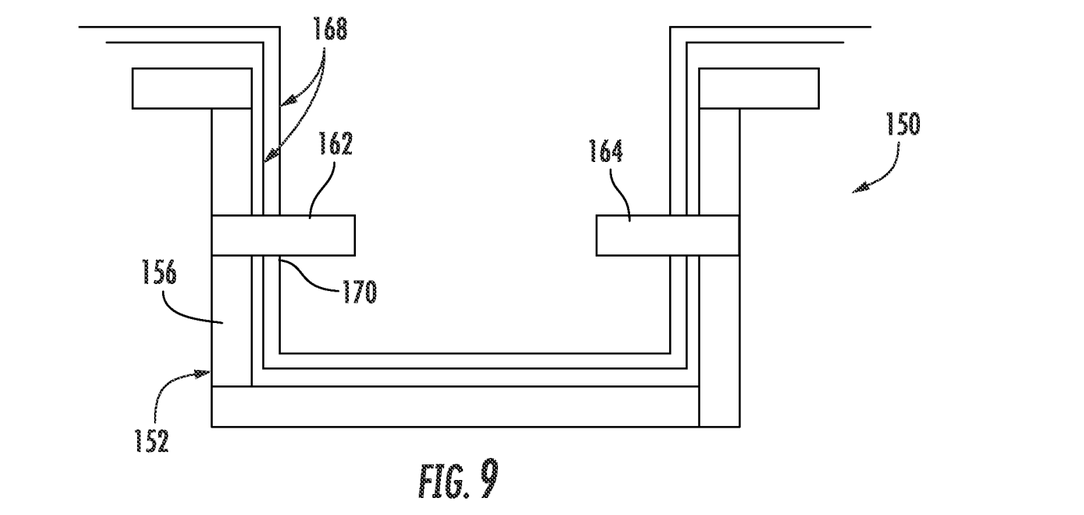
FIG. 9 illustrates a front view of the mold of FIG. 8 with a plurality of outer fiber layers laid therein.

Referring back to FIG. 7, as shown at (106), the method 100 may include laying up one or more outer fiber layers 168 in the mold 150 so as to at least partially cover the outer wall 156. More specifically, as shown in FIG. 9, the outer fiber layer(s) 167 may have at least one pre-cut hole or opening 169 that fits around the tooling pin(s) 162, 164. Thus, as shown, the outer fiber layer(s) 168 can be easily laid around the tooling pin(s) 162, 164 within the mold 150. As such, the outer fiber layer(s) 168 forms the outer surface of the beam structure 40.

Figure 10:
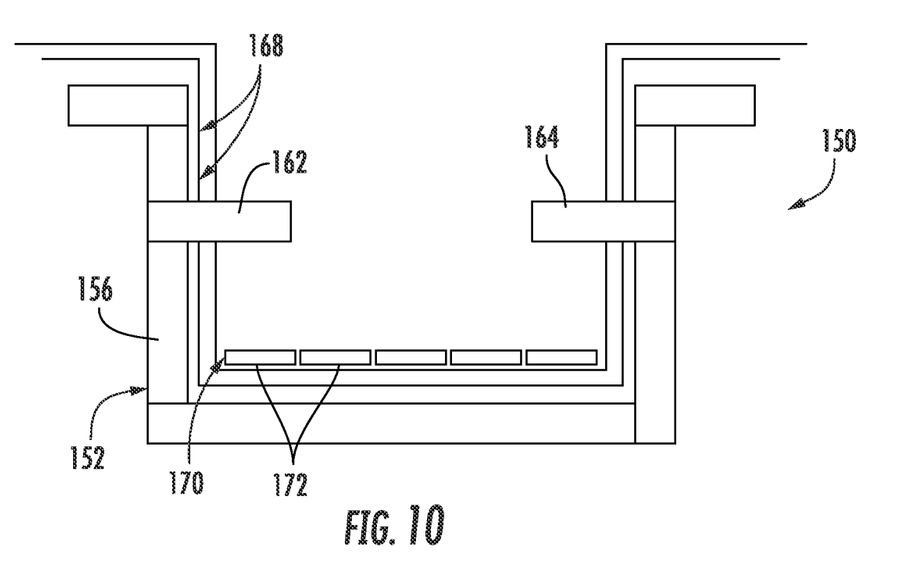
FIG. 10 illustrates a front view of the mold of FIG. 8 with a first layer of pultrusions laid atop the outer fiber layers.
Figure 11:
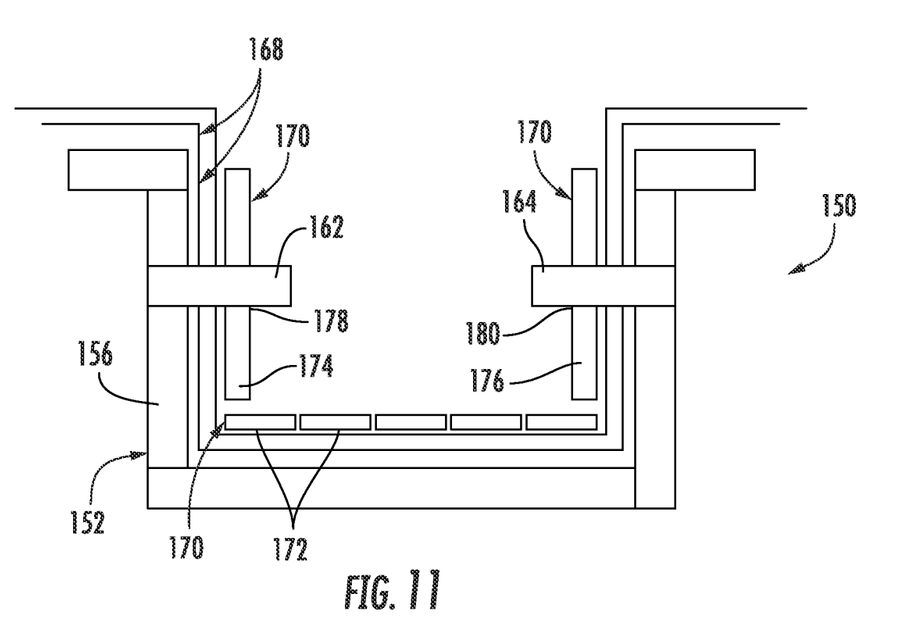
FIG. 11 illustrates a front view of the mold of FIG. 8 with a plurality of shear webs defining holes therein fitted around the plurality of tooling pins.

Referring back to FIG. 7, as shown at (108), the method 100 may include placing one or more structural features 170 atop the outer fiber layer(s) 168 in the mold 150. For example, as shown in FIG. 10, a first layer 172 of one or more pultrusions may be placed atop the outer fiber layer(s) 168. In another embodiment, as shown in FIG. 11, one or more shear webs 174, 176 may also be placed atop the outer fiber layer(s) 168 and/or the first layer 172 of the pultrusion (s). In such embodiments, as shown, the shear web(s) 174, 176 may also include a pre-cut hole 178, 180 that fits around the tooling pin(s) 162, 164. More specifically, as shown, a leading edge shear web 174 may be placed at the leading edge end 158 of the mold 150 such that a leading edge hole 178 of the leading edge shear web(s) 174 fits around the leading edge tooling pin 162 and a trailing edge shear web 176 may be placed at the trailing edge end 160 of the mold 150 such that a trailing edge hole 180 of the trailing edge shear web(s) 176 fits around the trailing edge tooling pin 164. In alternative embodiments, the shear web(s) 174, 176 may be split into multiple segments so as to fit around the tooling pin(s) 162, 164.

Figure 12:
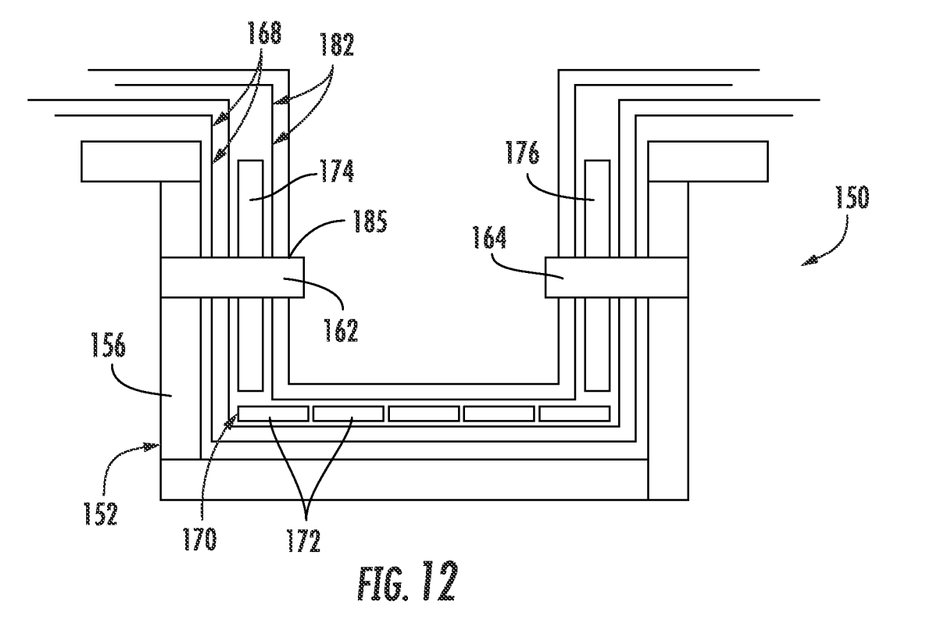
FIG. 12 illustrates a front view of the mold of FIG. 8 with a plurality of inner fiber layers laid atop the first layer of pultrusions.
Figure 13:
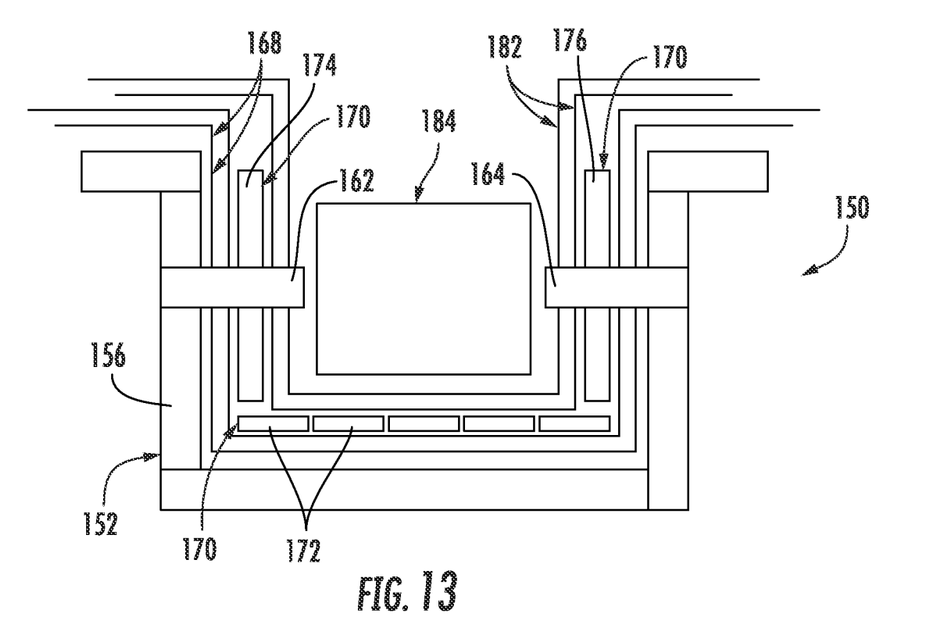
FIG. 13 illustrates a front view of the mold of FIG. 8 with a mandrel placed atop the plurality of inner fiber layers.
Figure 14:
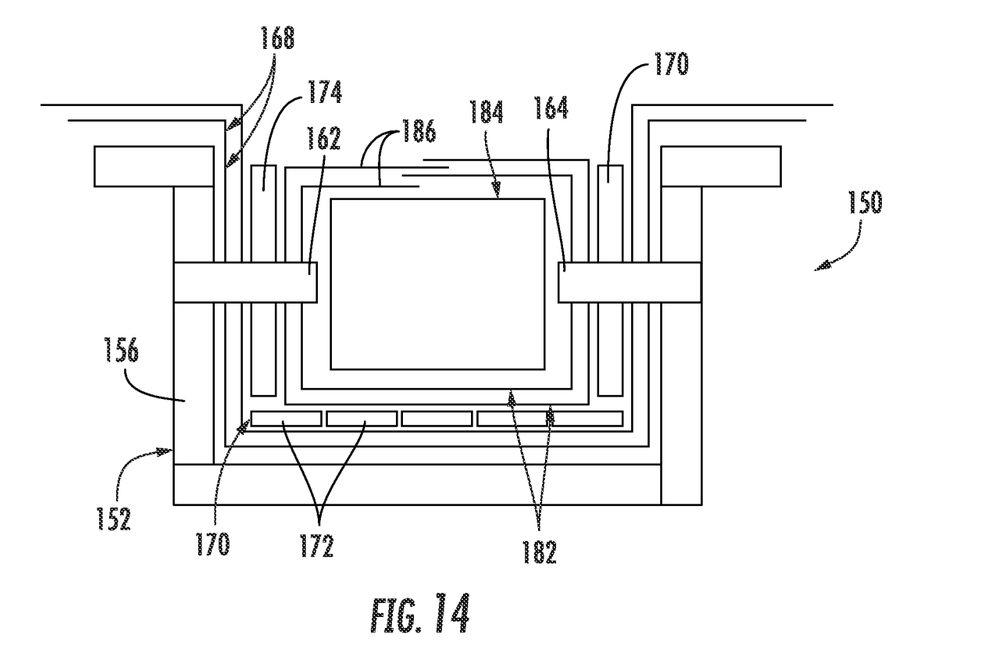
FIG. 14 illustrates a front view of the mold of FIG. 8 with the ends of the plurality of inner fiber layers folded around the mandrel.
Figure 15:
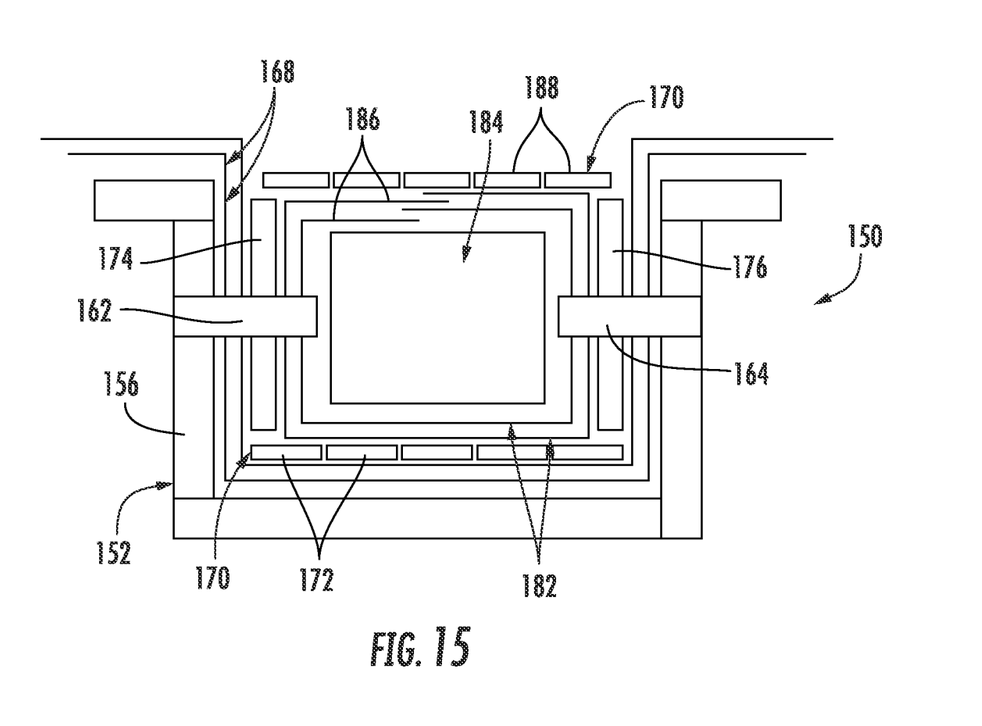
FIG. 15 illustrates a front view of the mold of FIG. 8 with a second layer of pultrusions placed atop the folded ends of the plurality of inner fiber layers.
Figure 16:
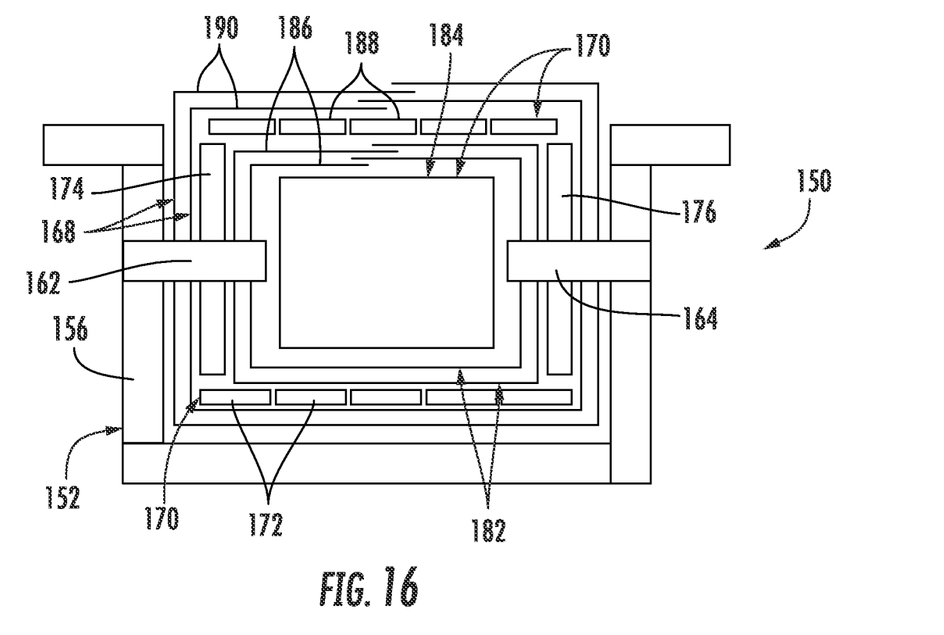
FIG. 16 illustrates a front view of the mold of FIG. 8 with the ends of the plurality of outer fiber layers folded around the second layer of pultrusions.

Referring now to FIG. 12, in certain embodiments, the method 100 may include placing one or more inner fiber layers 182 in the mold 150 so as to cover the shear web(s) 174, 176 and the first layer 172 of the pultrusion(s). In addition, as shown, the inner fiber layer(s) 182 may also include one or more pre-cut holes 185 that fit around the leading and trailing edge tooling pin(s) 162, 164. In another embodiment, as shown in FIG. 13, the method 100 may also include placing a mandrel 184 atop the outer and inner fiber layer(s) 168, 182 (e.g. between the tooling pin(s) 162, 164) so as to provide a base shape for shaping the beam structure 40 thereon. Accordingly, as shown in FIG. 14, the method 100 may also include folding ends 186 of the inner fiber layer(s) 182 around the mandrel(s) 184. In addition, as shown in FIG. 15, the method 100 may include placing a second layer 188 of one or more pultrusions atop the folded ends 186 of the inner fiber layer(s) 182. Further, as shown in FIG. 16, the method 100 may include folding ends 190 of the outer fiber layer(s) 168 around the second layer 188 of the pultrusion(s).

Figure 17:
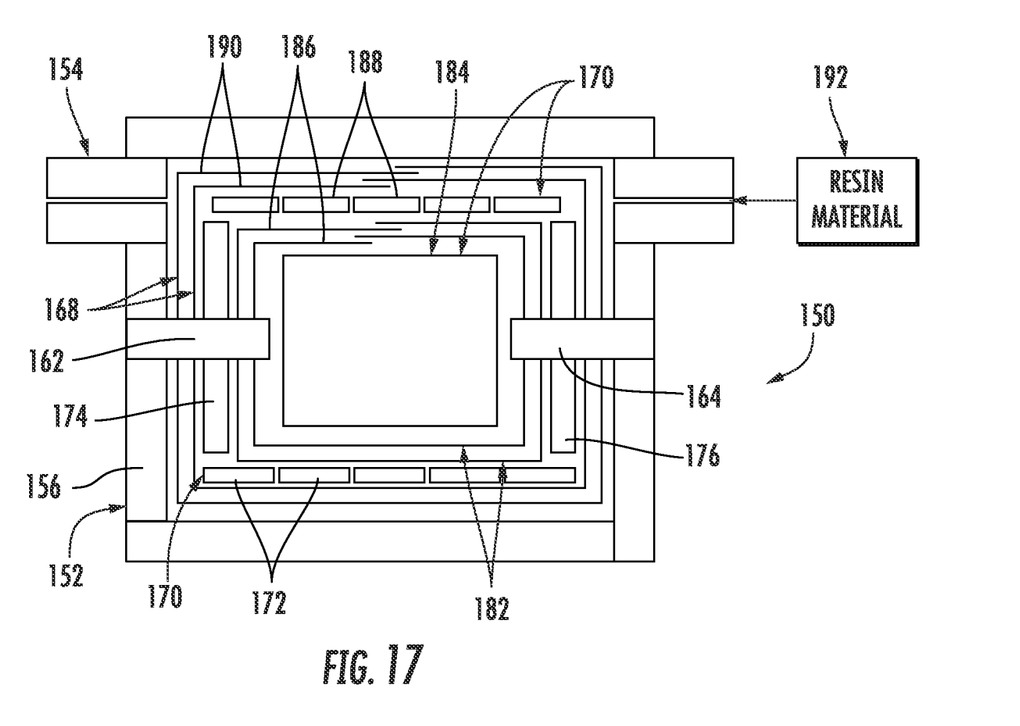
FIG. 17 illustrates a front view of the mold of FIG. 8 with first and second mold portions arranged together to form a vacuum that draws a resin material therein.

Referring back to FIG. 7, as shown at (110), the method 100 may then include infusing the outer fiber layer(s) 168, the structural feature(s) 170, and/or the inner fiber layer(s) 182 together via a resin material 192 so as to form the beam structure 40. More specifically, as shown in FIG. 17, the mold 150 may include a first mold portion 152 and a second mold portion or mold cover 154. Thus, method 100 may include placing the mold cover 154 atop the first mold portion 152 so as to create a vacuum and then subsequently infusing the components within the mold 150 together via the resin material 192 so as to form the beam structure 40.

Figure 18:
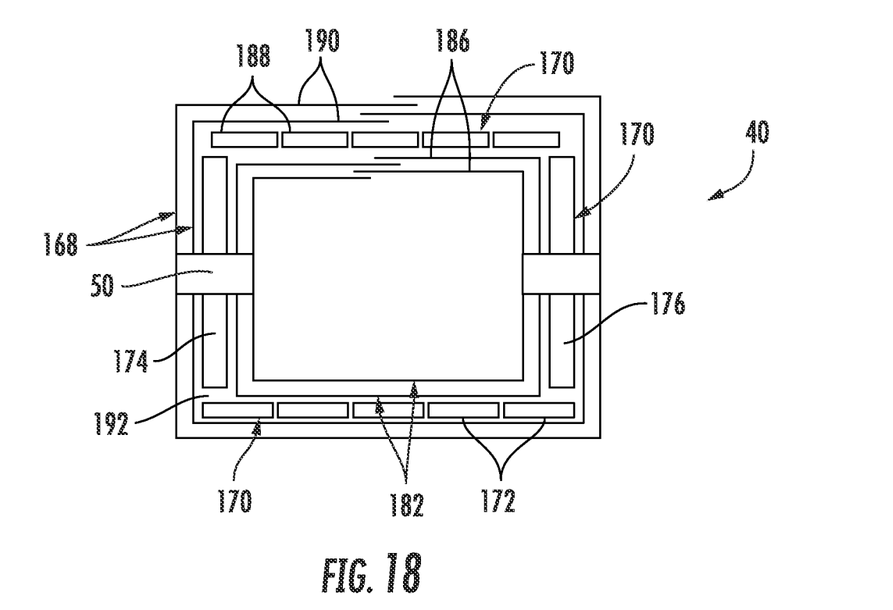
FIG. 18 illustrates a front view of a finished beam structure of a blade segment of a rotor blade manufactured according to the present disclosure.

After the components of the beam structure 40 are infused together and cured, the method 100 may also include removing the beam structure 40 from the mold 150 and/or removing the leading edge tooling pin 162, the trailing edge tooling pin 164, and/or the mandrel 184 from within the beam structure 40 so as to form the pin joint slot 50, as shown in FIG. 18. For example, in one embodiment, the mandrel 184 may include air that can be removed via the same vacuum system used to infused the structural component together. As such, once the mandrel 184 is deflated, it can be easily removed from a tip end of the finished beam structure 40.

Figure 19:
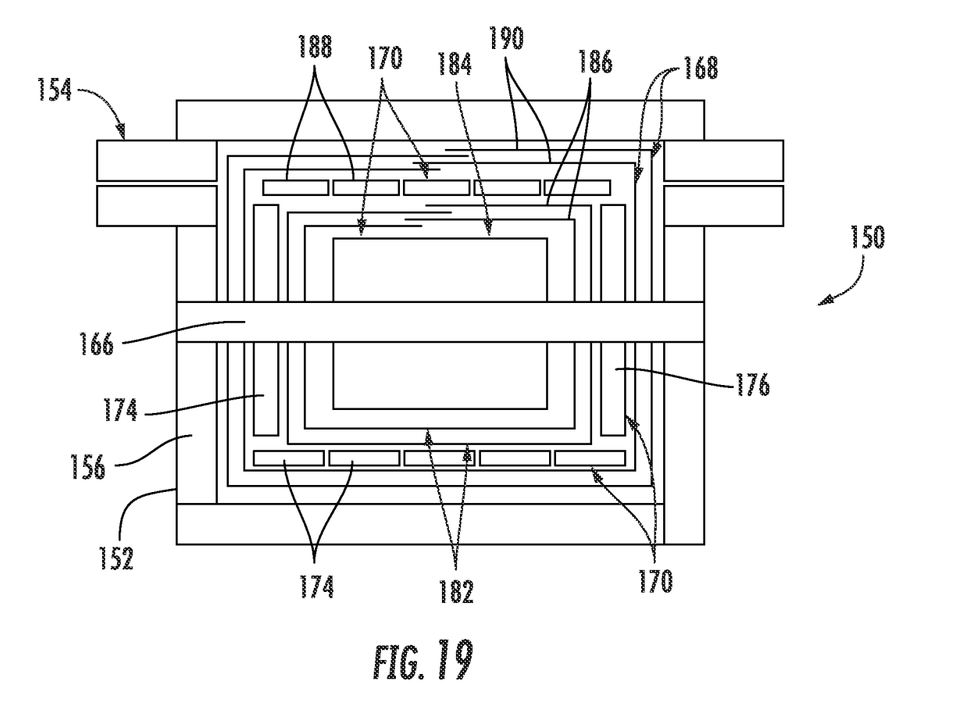
FIG. 19 illustrates a front view of one embodiment of a mold of a beam structure of a blade segment of a rotor blade according to the present disclosure, particularly illustrating a single tooling pin arranged in the mold for defining a pin joint slot of the beam structure during the manufacturing process.
Figure 20:
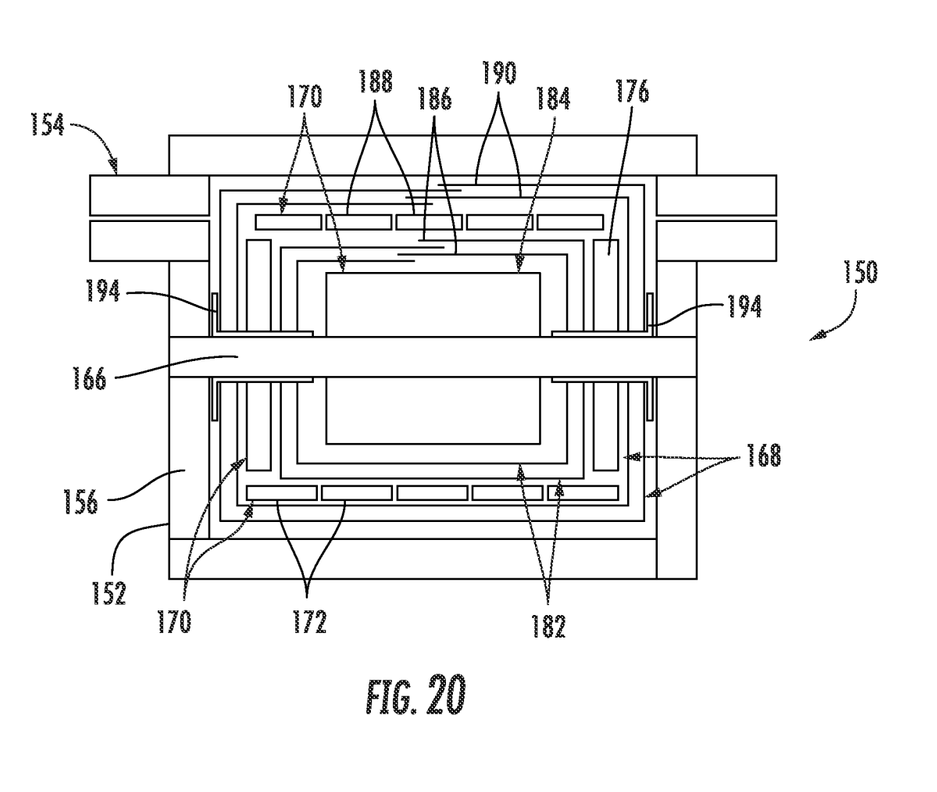
FIG. 20 illustrates a front view of another embodiment of a mold of a beam structure of a blade segment of a rotor blade according to the present disclosure, particularly illustrating a single tooling pin arranged in the mold for defining a pin joint slot of the beam structure during the manufacturing process.

Referring now to FIGS. 19 and 20, in alternative embodiments, rather than utilizing two tooling pins, the method 100 may include securing a single tooling pin 166 that extends from the leading edge end 158 of the mold 150 to the trailing edge end 160 of the mold 150. In such embodiments, the various materials of the beam structure 40 may be placed in and around the tooling pin 166 during the manufacturing process. In addition, the tooling pin 166 may be moved and/or adjusted during the manufacturing process so as to allow the various materials to be accurately placed and aligned within the mold 150 in and around the tooling pin 166.

In such embodiments, as shown in FIG. 20, the method 100 may further include placing one or more bushings 194 to the outer wall 156 within the mold 150 and securing the tooling pin(s) 162, 164 within the bushing(s) 194. Thus, once the tooling pin 166 is removed, the bushings 194 remain coaxially aligned to define the pin joint slot 50.

The resin material described herein may include, for example, a thermoset material or a thermoplastic material. The thermoplastic materials as described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluoropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, the fiber layers described herein may include, for example, glass fibers, carbon fibers, polymer fibers, wood fibers, bamboo fibers, ceramic fibers, nanofibers, metal fibers, or combinations thereof. In addition, the direction or orientation of the fibers may include quasi-isotropic, multi-axial, unidirectional, biaxial, triaxial, or any other another suitable direction and/or combinations thereof.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a structural component of a blade segment for a segmented rotor blade of a wind turbine, the method comprising:
   providing a mold of the structural component, the mold having an outer wall that defines an outer surface of the structural component;
   securing at least one tooling pin to the outer wall for defining a pin joint slot in the structural component;
   laying up one or more outer fiber layers in the mold so as to at least partially cover the outer wall, the one or more outer fiber layers having at least one hole that receives the at least one tooling pin, the one or more outer fiber layers forming the outer surface of the structural component;
   placing one or more structural features atop the one or more outer fiber layers in the mold; and,
   infusing the one or more outer fiber layers and the one or more structural features together via a resin material so as to form the structural component,
   wherein placing the one or more structural features atop the one or more outer fiber layers in the mold further comprises placing one or more shear webs atop the one or more outer fiber layers, the one or more shear webs comprising a web hole that receives the at least one tooling pin.

2. The method of claim 1, wherein the structural component comprises at least one of a beam structure or a receiving section of the blade segment.

3. The method of claim 2, wherein placing the one or more structural features atop the one or more outer fiber layers in the mold further comprises placing a first layer of one or more pultrusions atop the one or more outer fiber layers.

4. The method of claim 1, further comprising placing one or more bushings to the outer wall within the mold and securing the at least one tooling pin within the one or more bushings.

5. The method of claim 2, wherein securing the at least one tooling pin to the outer wall for defining the pin joint slot in the beam structure further comprises securing a single tooling pin from a leading edge end of the mold to a trailing edge end of the mold.

6. The method of claim 3, wherein securing the at least one tooling pin to the outer wall for defining the pin joint slot in the beam structure further comprises securing a leading edge tooling pin at a leading edge end of the mold and securing a separate trailing edge tooling pin at a trailing edge end of the mold, the leading and trailing edge tooling pins being coaxially aligned in a chord-wise direction of the beam structure.

7. The method of claim 6, wherein placing the one or more shear webs atop the one or more outer fiber layers and the first layer of one or more pultrusions further comprises placing at least one leading edge shear web at the leading edge end of the mold such that a leading edge hole of the at least one leading edge shear web receives the leading edge tooling pin and placing a trailing edge shear web at the trailing edge end of the mold such that a trailing edge hole of the at least one trailing edge shear web receives the trailing edge tooling pin.

8. The method of claim 6, further comprising placing one or more inner fiber layers so as to cover the one or more shear webs and the first layer of one or more pultrusions.

9. The method of claim 8, further comprising placing at least one mandrel atop the one or more inner fiber layers so as to provide a base shape for shaping the structural component thereon, the mandrel comprising a compressible material.

10. The method of claim 9, further comprising folding ends of the one or more inner fiber layers around the at least one mandrel.

11. The method of claim 10, wherein placing the one or more structural features atop the one or more outer fiber layers in the mold further comprises placing a second layer of one or more pultrusions atop the folded ends of the one or more inner fiber layers.

12. The method of claim 11, further comprising folding ends of the one or more outer fiber layers around the second layer of the one or more pultrusions.

13. The method of claim 1, wherein the mold comprises a first mold portion and a second mold portion, the method further comprising placing the second mold portion atop the first mold portion that contains the one or more outer fiber layers and the one or more structural features and subsequently infusing the one or more outer fiber layers and the one or more structural features together so as to form the structural component.

14. The method of claim 6, further comprising removing the leading edge tooling pin and the trailing edge tooling pin, after infusing the one or more outer fiber layers and the one or more structural features together to partially form the pin joint slot.

15. A molding kit for manufacturing a beam structure of a blade segment for a segmented rotor blade of a wind turbine, the kit comprising:
a first mold portion comprising an outer wall that defines an outer surface of the beam structure;
at least one tooling pin secured to the outer wall for defining a pin joint slot in the beam structure; and,
a second mold portion configured to fit with the first mold portion after one or more materials are placed therein to form the beam structure so as to create a vacuum that can draw a resin material within the first and second mold portions for infusing the one or more materials together,
wherein the at least one tooling pin further comprises a leading edge tooling pin and a trailing edge tooling pin.

16. The molding kit of claim 15, wherein the one or more materials comprise at least one of one or more outer fiber layers, one or more layers of pultrusions, one or more shear webs, or one or more inner fiber layers, and wherein the resin material comprises at least one of a thermoset resin or a thermoplastic resin.

17. The molding kit of claim 15, wherein at least one of the one or more materials comprise a pre-cut hole that receives the at least one tooling pin when placed into the first mold portion.

18. The molding kit of claim 15, further comprising one or more bushings for securing to the outer wall within the first mold portion.

* * * * *